(12) United States Patent
Tanaka et al.

(10) Patent No.: US 7,983,007 B2
(45) Date of Patent: Jul. 19, 2011

(54) MAGNETIC TAPE APPARATUS

(75) Inventors: Kenji Tanaka, Osaka (JP); Sadamu Kuse, Osaka (JP)

(73) Assignee: Hitachi Maxell, Ltd., Ibaraki-shi, Osaka (JP)

( * ) Notice: Subject to any disclaimer, the term of this patent is extended or adjusted under 35 U.S.C. 154(b) by 713 days.

(21) Appl. No.: 12/045,820

(22) Filed: Mar. 11, 2008

(65) Prior Publication Data

US 2008/0225432 A1    Sep. 18, 2008

(30) Foreign Application Priority Data

Mar. 12, 2007    (JP) .................................. 2007-061975

(51) Int. Cl.
*G11B 5/584* (2006.01)
(52) U.S. Cl. ...................................................... 360/270
(58) Field of Classification Search .................. 360/270
See application file for complete search history.

(56) References Cited

U.S. PATENT DOCUMENTS

| | | | | |
|---|---|---|---|---|
| 4,392,163 | A * | 7/1983 | Rijckaert et al. ............... 360/76 |
| 5,566,378 | A * | 10/1996 | Nagasawa et al. ......... 360/77.16 |
| 5,883,770 | A | 3/1999 | Biskeborn et al. |
| 5,905,613 | A | 5/1999 | Biskeborn et al. |
| 5,949,619 | A * | 9/1999 | Eckberg et al. ............... 360/291 |
| 6,040,964 | A | 3/2000 | Saliba |
| 6,122,147 | A | 9/2000 | Fahimi et al. |
| 6,369,982 | B2 * | 4/2002 | Saliba ........................... 360/122 |
| 6,469,867 | B2 * | 10/2002 | Saliba ........................... 360/122 |
| 7,184,233 | B2 * | 2/2007 | Zweighaft ........................ 360/51 |
| 2001/0015870 | A1 * | 8/2001 | Saliba ........................... 360/122 |
| 2002/0080514 | A1 | 6/2002 | Richards et al. |
| 2005/0190485 | A1 * | 9/2005 | Ito et al. ...................... 360/77.12 |

FOREIGN PATENT DOCUMENTS

| | | |
|---|---|---|
| JP | 11-510297 A | 9/1999 |
| JP | 2000-207800 A | 7/2000 |
| JP | 2002-208198 A | 7/2002 |
| JP | 2004-110977 A | 4/2004 |
| JP | 2005-174450 A | 6/2005 |
| JP | 2006-127730 A | 5/2006 |

* cited by examiner

*Primary Examiner* — Mark Blouin
(74) *Attorney, Agent, or Firm* — Birch, Stewart, Kolasch & Birch, LLP (57) ABSTRACT

In a magnetic tape apparatus of the present invention, a magnetic head unit having magnetic elements capable of recording or reproducing information with respect to a magnetic tape includes a movable member that includes a magnetic element and has such a size that the movable member comes into contact with the magnetic tape over an entire region in a width direction, and is placed so as to move in the width direction of the magnetic tape, and a stationary member that is placed at a position adjacent to the movable member in a magnetic tape transport direction, wherein the movable member is moved in the width direction of the magnetic tape by a tracking servo mechanism during a tracking servo control. According to this configuration, a magnetic tape apparatus excellent in a tracking precision can be provided, in which even a magnetic tape with a high friction coefficient does not move following the movement of a magnetic head unit in the width direction.

6 Claims, 8 Drawing Sheets

MAGNETIC TAPE APPARATUS

BACKGROUND OF THE INVENTION

1. Field of the Invention

The present invention relates to a magnetic tape apparatus capable of recording or reproducing information with respect to a magnetic tape.

2. Description of Related Art

Recently, the amount of data dealt with in a computer system is increasing more and more along with the increase in a capacity of a hard disk. Therefore, the demand for a data backup system using a magnetic tape also is increasing. In such a data backup system, a linear magnetic tape apparatus is mounted.

A head used in the linear magnetic tape apparatus includes a member called a "rail" in an elongated shape in a tape width direction so that the rail comes into contact with an entire region of a magnetic tape in a width direction even when the head is moved between tracks. For example, a magnetic head of a linear tape open (LTO) type has a first rail and a second rail. The first rail and the second rail are arranged side by side in a transport direction of the magnetic tape so that the respective longitudinal directions are substantially perpendicular to the transport direction of the magnetic tape. A first magnetic element is mounted on the first rail, which performs a recording operation when the magnetic tape is transported in one direction and performs a reproduction operation when the magnetic tape is transported in the other direction. A second magnetic element is mounted on the second rail, which performs a recording operation when the magnetic tape is transported in the other direction and performs a reproduction operation when the magnetic tape is transported in the one direction.

Furthermore, the magnetic head may include a plurality of third rails on which magnetic elements are not mounted, in addition to the first and second rails as described above. The third rails are placed on a magnetic tape input side or output side in the first and second rails so that tape sliding surfaces of the third rails are substantially flush with tape sliding surfaces of the first and second rails. Furthermore, the third rails can stabilize the relative position of the magnetic tape with respect to the magnetic head when the magnetic tape is in contact with the magnetic head, and keep the contact state between the magnetic tape and the first and second rails in a stable state. Furthermore, the third rails can remove foreign matter adhering to the surface of the magnetic tape. Thus, the third rails can prevent the foreign matter from entering between the rails and the magnetic tape to inhibit recording and reproduction operations. Patent Document 1 (JP 2006-127730 A) discloses a magnetic head with a configuration as described above.

The recording wavelength of the magnetic tape is decreased along with the further increase in a recording capacity, and the surface of the magnetic tape is being smoothened so as to suppress the degradation in the recording and reproduction characteristics caused by spacing. When the surface of the magnetic tape is smoothened, the contact area between the magnetic head and the magnetic tape increases to enhance a friction coefficient therebetween. When the friction coefficient increases, the magnetic tape moves in the tape width direction, following the movement of the magnetic head in the tape width direction by a tracking servo control and the like, with the result that the tracking operation of the magnetic head becomes unstable.

Figure 5A:
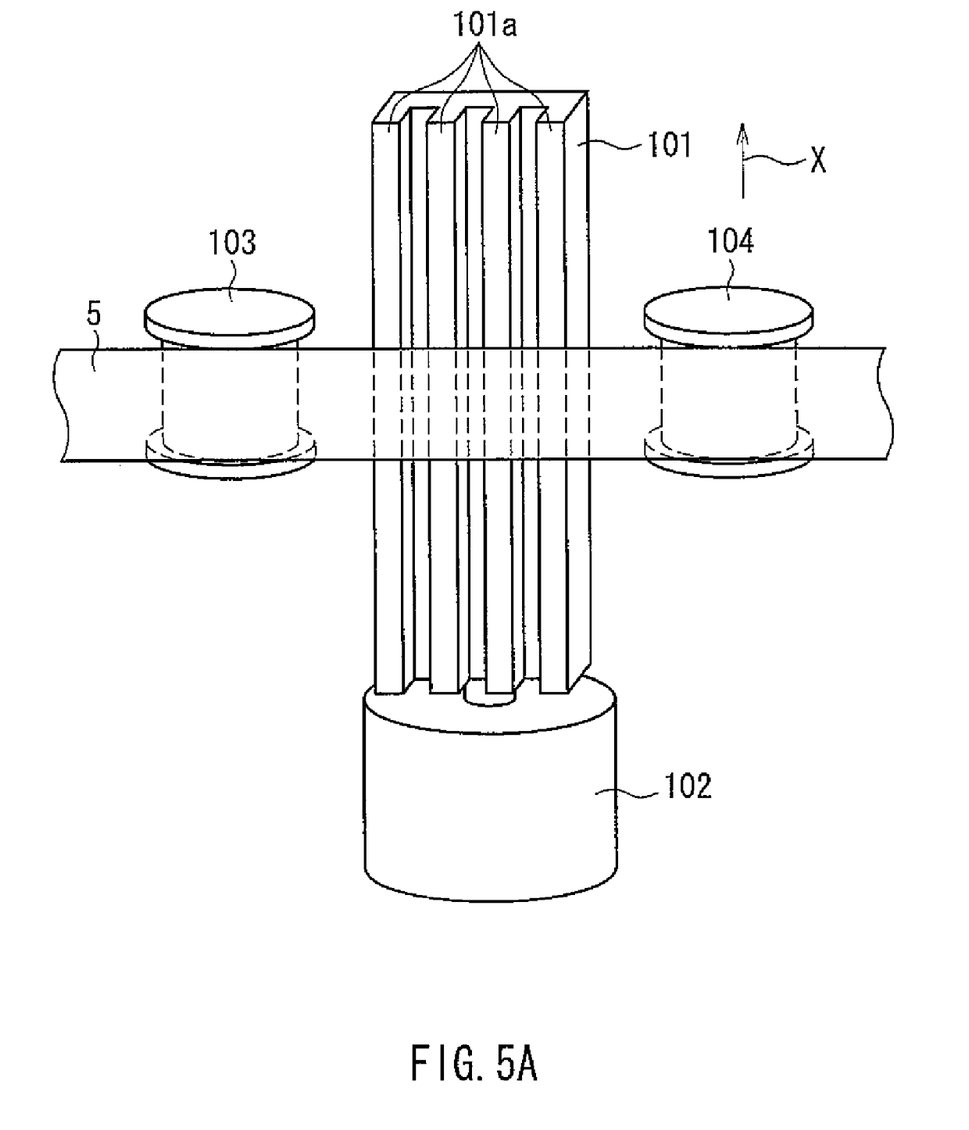
FIG. 5A is a perspective view showing a configuration of a conventional magnetic tape apparatus.
Figure 5B:
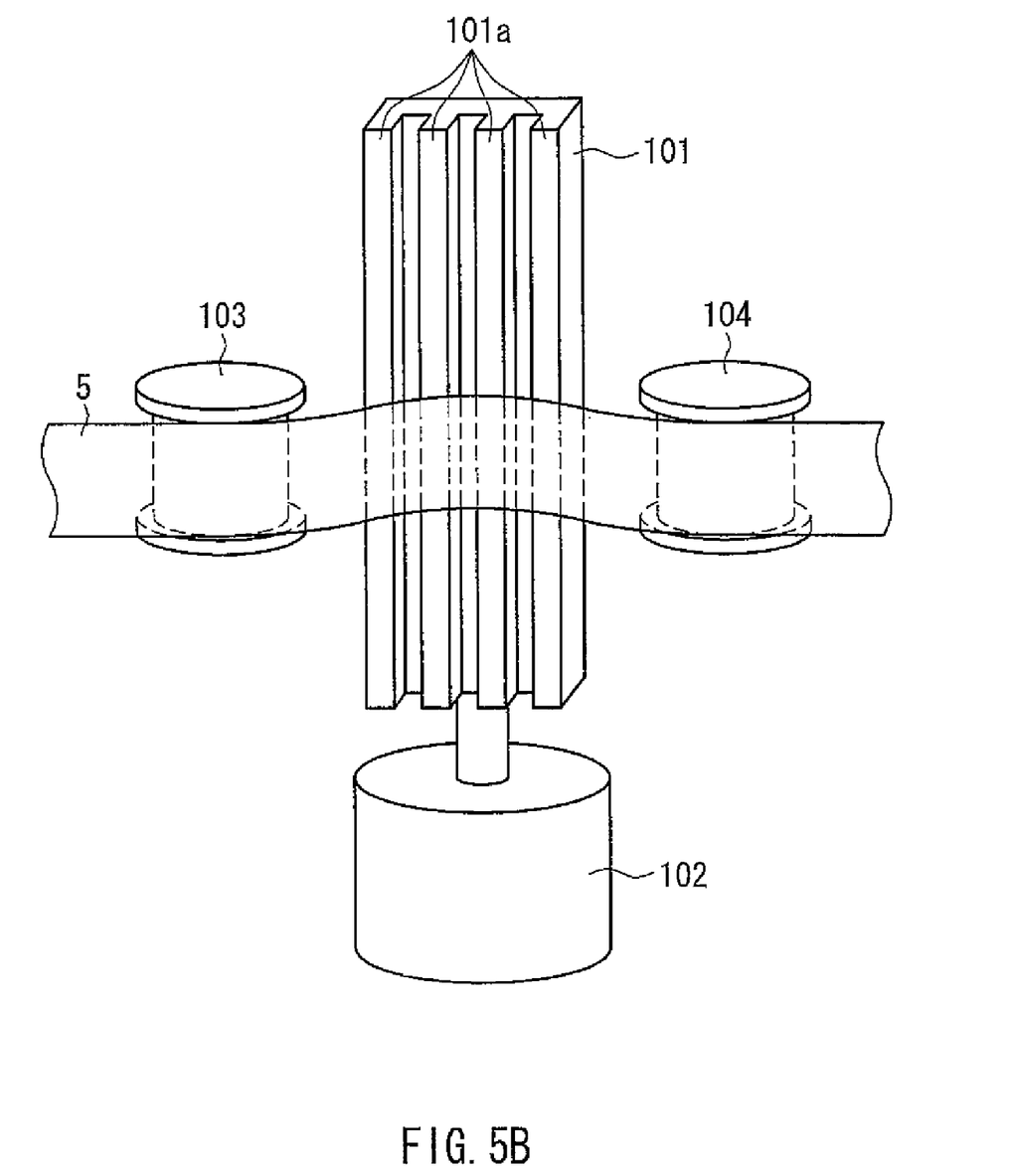
FIG. 5B is a perspective view showing a configuration of the conventional magnetic tape apparatus.

FIG. 5A shows a state before the magnetic head is moved, and FIG. 5B shows a state after the magnetic head is move by the tracking servo control. When a magnetic head unit 101 is moved in a direction represented by an arrow X from the state shown in FIG. 5A, a magnetic tape 5 is moved in the direction represented by the arrow X by the friction force between a sliding surface 101a and the magnetic tape 5, as shown in FIG. 5B.

SUMMARY OF THE INVENTION

The object of the present invention is to provide a magnetic tape apparatus excellent in a tracking precision in which even a magnetic tape having a high friction coefficient does not move following the movement of a magnetic head in a width direction.

A magnetic tape apparatus of the present invention includes: a magnetic head unit having a magnetic element capable of recording or reproducing information with respect to a magnetic tape that has a magnetic layer on one surface; and a tracking servo mechanism positioning the magnetic element in a predetermined track of the magnetic tape, wherein the magnetic head unit includes: a movable member that includes the magnetic element and has such a size as that the movable member comes into contact with the magnetic tape over an entire region in a width direction, and is placed so as to move in the width direction of the magnetic tape; and a stationary member placed at a position adjacent to the movable member in a magnetic tape transport direction, and during a tracking servo control, the movable member and the stationary member come into contact with a surface of the magnetic layer of the magnetic tape simultaneously, and the movable member is moved in the width direction of the magnetic tape by the tracking servo mechanism.

Furthermore, a magnetic tape apparatus of the present invention includes: a magnetic head unit having a magnetic element capable of recording or reproducing information with respect to a magnetic tape that has a magnetic layer on one surface; and a tracking servo mechanism positioning the magnetic element in a predetermined track of the magnetic tape, wherein the magnetic head unit includes: a first movable member that includes the magnetic element and has such a size that the first movable member comes into contact with the magnetic tape over an entire region in a width direction, and is placed so as to move in the width direction of the magnetic tape; and a second movable member that is placed at a position adjacent to the first movable member in a magnetic tape transport direction and is placed so as to move in the width direction of the magnetic tape, and during a tracking servo control, the first movable member and the second movable member come into contact with a surface of the magnetic layer of the magnetic tape simultaneously and are moved in directions opposite to each other by the tracking servo mechanism.

According to the present invention, when the magnetic head is moved in the tape width direction, the magnetic tape is prevented from moving in the width direction, whereby the magnetic tape is allowed to travel stably to enhance a tracking precision.

In particular, even a magnetic tape with a high friction coefficient does not move following the movement of the magnetic head in the width direction, whereby a tracking precision can be enhanced.

DETAILED DESCRIPTION OF THE INVENTION

Embodiment 1

Figure 1A:
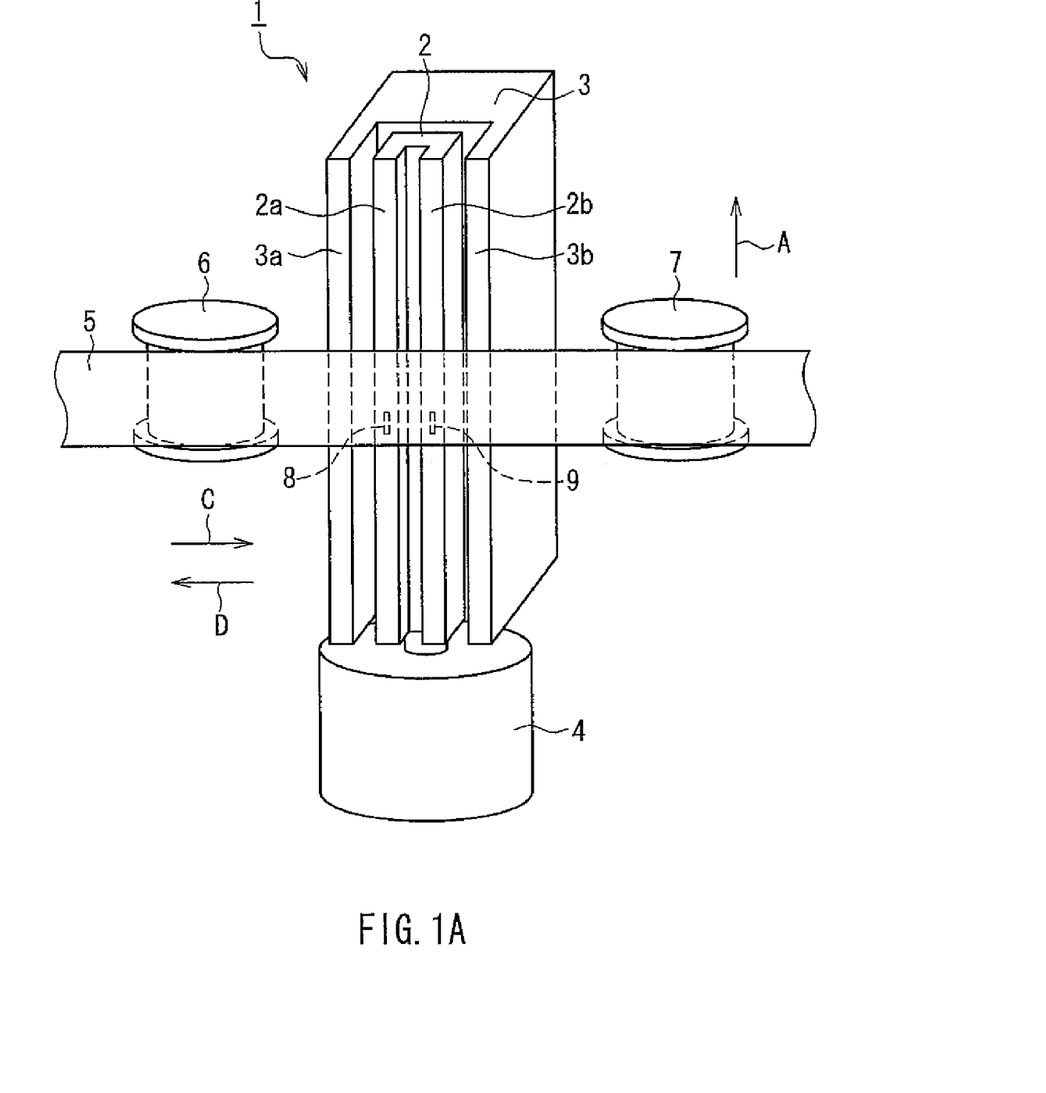
FIG. 1A is a perspective view showing a configuration of a magnetic tape apparatus in Embodiment 1.
Figure 1B:
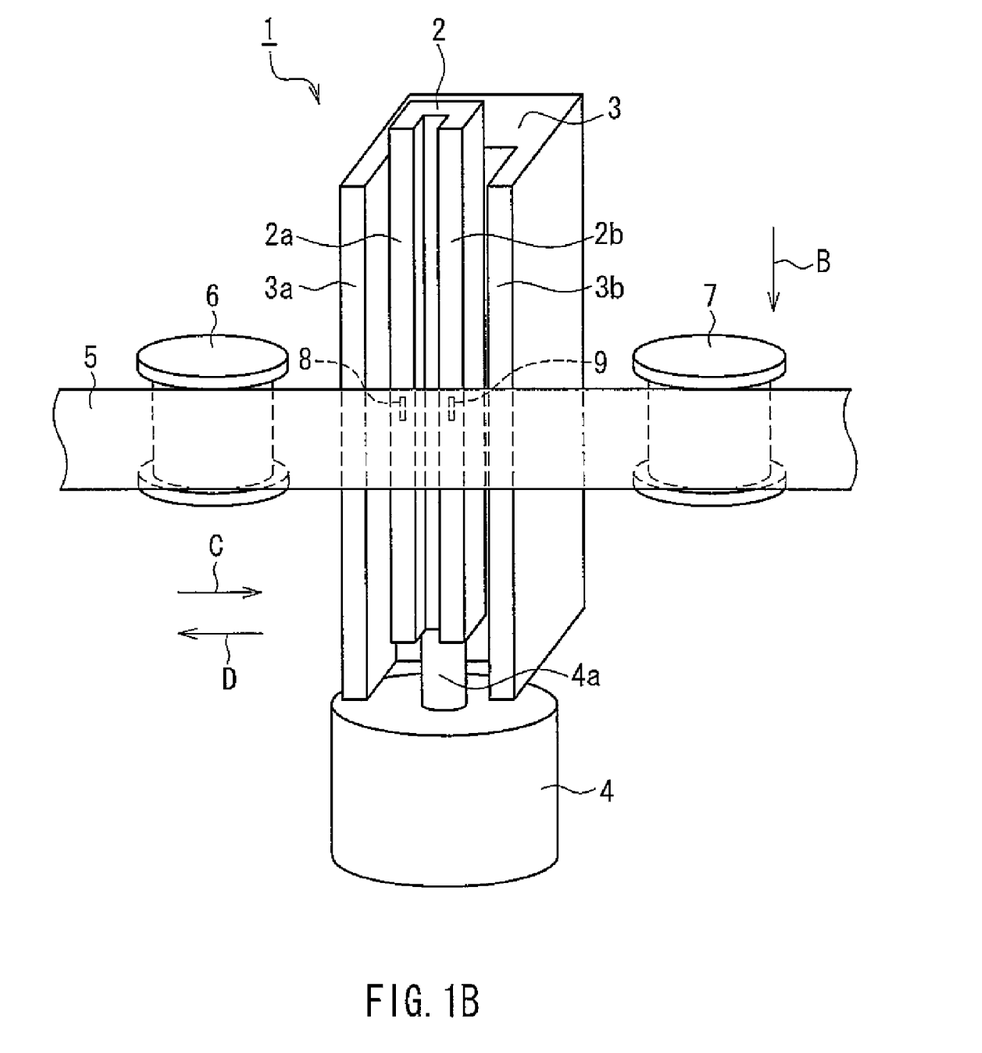
FIG. 1B is a perspective view showing a configuration of the magnetic tape apparatus in Embodiment 1.

FIGS. 1A and 1B are perspective views each showing a configuration of a magnetic tape apparatus in Embodiment 1. FIG. 1A shows a state in which a movable member is placed at a lower end in a tape width direction. FIG. 1B shows a state in which the movable member is placed at an upper end in the tape width direction.

A magnetic head unit 1 is composed of a movable member 2 and a stationary member 3. The stationary member 3 and an actuator 4 are fixed to a base (not shown) placed in the magnetic tape apparatus. The direction represented by arrows A and B is defined as a "tape width direction", and the direction represented by arrows C and D is defined as a "tape transport direction". Furthermore, an upstream side while a magnetic tape 5 is transported in the direction represented by the arrow C, i.e., a left side on the drawing surface of FIG. 1A, is defined as a "tape upstream side". A downstream side while the magnetic tape 5 is transported in the direction represented by the arrow C, i.e., a right side on the drawing surface of FIG. 1A is defined as a "tape downstream side".

The movable member 2 allows an output shaft 4a of the actuator 4 to be screwed in, and is placed so as to move in the direction represented by the arrow A or B when the actuator 4 is operated. Furthermore, the movable member 2 comes into contact with a surface of the magnetic tape 5 on which a magnetic layer is formed when the magnetic tape apparatus performs a tracking servo control. Furthermore, the size of the movable member 2 in the tape width direction is designed so that the movable member 2 can come into contact with the magnetic tape 5 over the entire region in the width direction while the movable member 2 is positioned at the lower end in the tape width direction (see FIG. 1A) and while the movable member 2 is positioned at the upper end in the tape width direction (see FIG. 1B). In the present embodiment, the size of the movable member 2 in the tape width direction is set to be about twice the width of the magnetic tape 5. Furthermore, the movable member 2 has a first sliding surface 2a and a second sliding surface 2b so that they are arranged side by side in the tape transport direction. The first sliding surface 2a is provided with a magnetic element 8. The second sliding surface 2b is provided with a magnetic element 9. A groove for generating a negative pressure to stabilize the position of the magnetic tape 5 is formed between the first sliding surface 2a and the second sliding surface 2b.

The stationary member 3 is fixed to a holder (not shown) placed in the magnetic head unit 1. Furthermore, the stationary member 3 comes into contact with the surface of the magnetic tape 5 on which a magnetic layer is formed when the magnetic tape apparatus performs a tracking servo control.

Furthermore, the stationary member 3 includes a third sliding surface 3a and a fourth sliding surface 3b. The third sliding surface 3a is placed on the tape upstream side with respect to the first sliding surface 2a, and the fourth sliding surface 3b is placed on the tape downstream side with respect to the second sliding surface 2b. Furthermore, the sliding surfaces 2a, 2b, 3a, and 3b are formed with substantially the same height. Furthermore, the sliding surfaces 2a, 2b, 3a, and 3b may be all formed in a flat shape or in a curved shape.

The actuator 4 includes the output shaft 4a with a gear formed on the surface thereof. The output shaft 4a is screwed in a screw hole formed on an end surface of the movable member 2.

Figure 2:
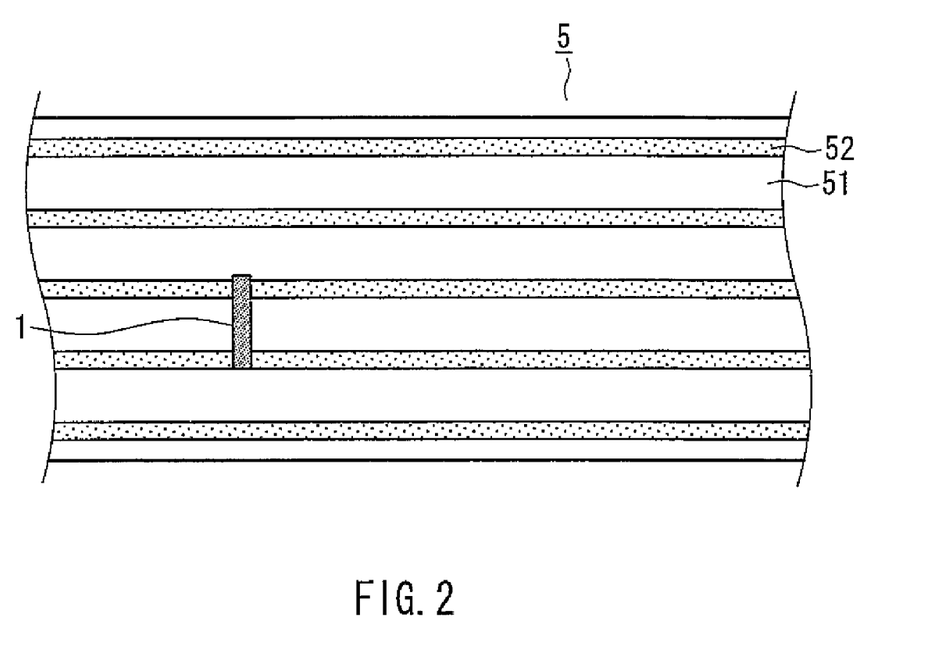
FIG. 2 is a schematic view showing a configuration of a recording format of a magnetic tape.

The magnetic tape 5 has a configuration in which a magnetic layer is formed on one surface of a base film, and a back coat layer is formed on the other surface of the base film. Furthermore, the magnetic tape 5 is composed of a magnetic tape for recording data, and in the present embodiment, a magnetic tape in conformity with the LTO standards is used. FIG. 2 is a view showing a configuration of the magnetic tape. As shown in FIG. 2, data bands 51 and servo bands 52 are formed on the magnetic tape 5 in a longitudinal direction. The data bands 51 are regions for recording data. The servo bands 52 are regions in which a servo signal used for a tracking servo control is recorded. In the data bands 51, a plurality of tracks are formed in parallel with the width direction of the magnetic tape 5. The servo bands 52 are formed at positions adjacent to an upper end and a lower end of each data band 51.

Guide rollers 6 and 7 respectively are composed of a cylindrical roller and flanges formed in upper and lower portions of the roller. When the magnetic tape 5 is wound around the guide rollers 6 and 7, the guide rollers 6 and 7 support upper and lower edges of the magnetic tape 5 with the flanges to regulate the position of the magnetic tape 5 in the width direction, while regulating the position of the magnetic tape 5 in a twist direction.

The magnetic elements 8 and 9 respectively are composed of, for example, an inductive head for a recording element and an MR head for a reproduction element. When data is recorded by transporting the magnetic tape 5 in the direction represented by the arrow C, the magnetic element 8 performs a recording operation and the magnetic element 9 performs a reproduction operation. Furthermore, when data is recorded by transporting the magnetic tape 5 in the direction represented by the arrow D, the magnetic element 8 performs a reproduction operation and the magnetic element 9 performs a recording operation. The purpose of allowing either one of the magnetic elements 8 and 9 to perform a reproduction operation when data is recorded on the magnetic tape 5 is to check the recorded data immediately after recording.

The groove formed between the movable member 2 and the stationary member 3, and the groove formed between the first sliding surface 2a and the second sliding surface 2b in the movable member 2 are formed so as to generate a negative pressure with respect to the magnetic tape 5 to enhance the contact pressure of the magnetic tape 5 with respect to the sliding surfaces.

Figure 3A:
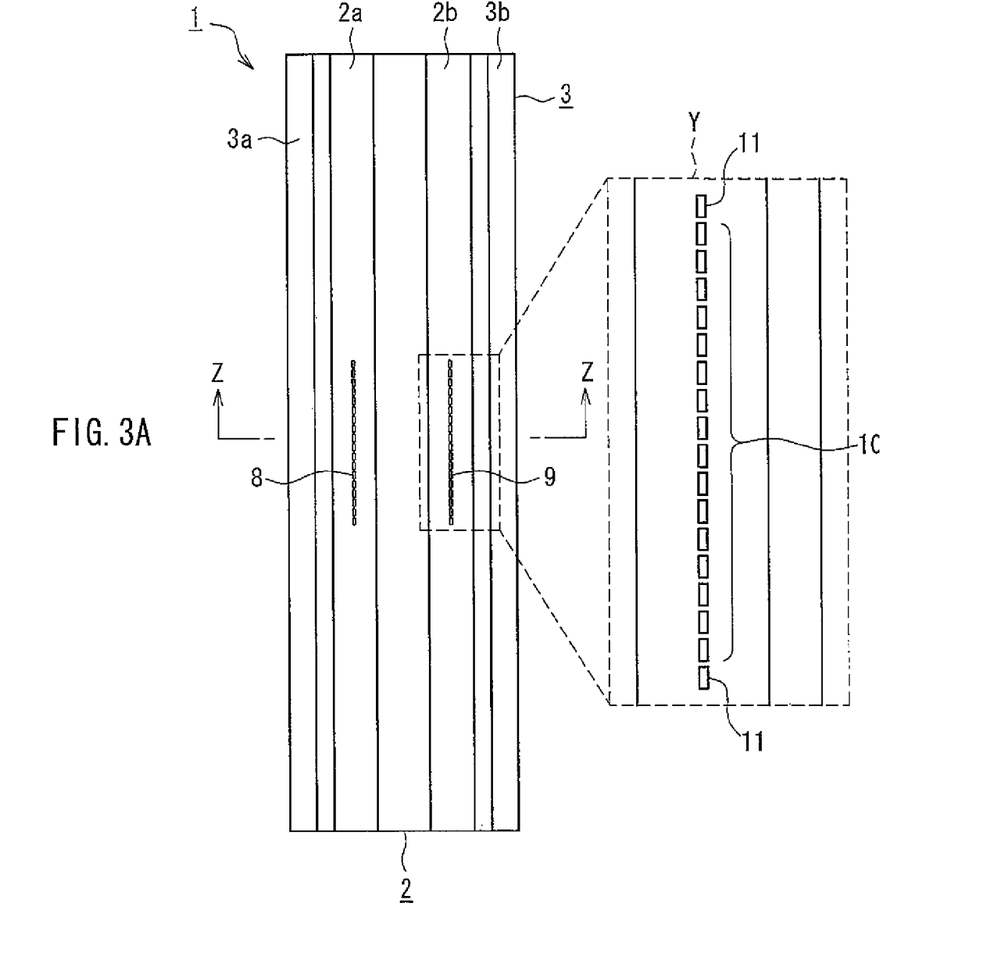
FIG. 3A is a plan view showing a configuration of a magnetic head.
Figure 3B:
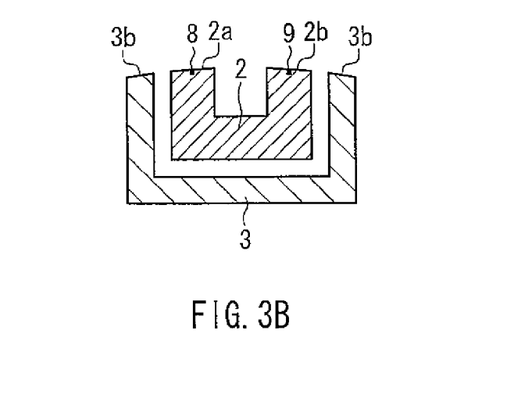
FIG. 3B is a cross-sectional view showing a configuration of the magnetic head.

FIG. 3A is a plan view showing a configuration of the sliding surfaces of the movable member 2 and the stationary member 3. FIG. 3B is a cross-sectional view of a Z-Z portion in FIG. 3A. A frame Y shows a portion of the movable member 2 provided with the magnetic element 9 in an enlarged state. As shown in the frame Y, data heads 10 for recording or reproducing data and servo heads 11 for reproducing a servo signal are arranged in the movable direction of the movable member 2 respectively in the magnetic elements 8 and 9. In the present embodiment, the magnetic elements 8 and 9 respectively have 16 data heads 10 and 2 servo heads 11. Furthermore, the magnetic elements 8 and 9 are placed substantially at the center in the longitudinal direction of the movable member 2. The numbers of the data heads 10 and the servo heads 11 are not limited to the above.

When data is recorded or reproduced with respect to a data band of the magnetic tape 5, it is necessary to move the magnetic elements 8 and 9 to the positions where a predetermined data band among the plurality of data bands formed on the magnetic tape 5 can be traced. In the present embodiment, the movable member 2 is moved in the direction represented by the arrow A or B to move the magnetic elements 8 and 9 onto the predetermined data band. Furthermore, when a tracking servo control is performed, the movable member 2 is moved in the direction represented by the arrow A or B so that the off-track amount between the track on the magnetic tape 5 separately detected and the magnetic elements 8 and 9 becomes zero. Hereinafter, the operation of the magnetic tape apparatus will be described by exemplifying the magnetic head movement between the data bands.

As shown in FIG. 1A, when the magnetic elements 8 and 9 trace a data band at the lower end in the tape width direction, the magnetic tape 5 is transported in the direction represented by the arrow C or D while the positions of the magnetic tape 5 in the twist direction and the width direction are regulated by the guide rollers 6 and 7. When the magnetic tape 5 is transported in the direction represented by the arrow C, data is recorded on the magnetic tape 5 with the magnetic element 8. When the magnetic tape 5 is transported in the direction represented by the arrow D, data is recorded on the magnetic tape 5 with the magnetic element 9. During this time, the servo heads 11 reproduce a servo signal recorded on the servo bands formed in the upper and lower portions of the data band.

Next, when the magnetic elements 8 and 9 are moved onto another data band from the state shown in FIG. 1A, the actuator 4 is driven to rotate the output shaft 4*a*. When the output shaft 4*a* is rotated, the movable member 2 is moved in the direction represented by the arrow A. When the magnetic elements 8 and 9 move onto the predetermined data band, the operation of the actuator 4 is stopped, and the movement of the movable member 2 is stopped. FIG. 1B shows a state in which the magnetic elements 8 and 9 are positioned on the data band at the upper end in the tape width direction.

When the magnetic elements 8 and 9 are allowed to follow a track during a tracking servo control, a control signal is input to the actuator 4 so that a separately calculated off-track amount becomes zero, whereby the movable member 2 is moved in the tape width direction by a predetermined amount, and the magnetic elements 8 and 9 are allowed to follow the track.

According to the present embodiment in the case where the tape sliding portion in the magnetic head unit 1 is composed of the movable member 2 and the stationary member 3, and the magnetic elements 8 and 9 are moved between the data bands or a tracking servo control is performed, only the movable member 2 is moved in the width direction of the magnetic tape 5, so that the change in a position in the width direction of the magnetic tape 5 can be reduced. More specifically, by moving only a part (movable member 2) of the tape sliding portion, instead of moving the entire tape sliding portion in the magnetic head apparatus in the tape width direction as in the conventional example, the movement force applied to the magnetic tape 5 in the width direction becomes small, and the change in a position of the magnetic tape 5 in the width direction can be reduced. Thus, due to the flattening of the magnetic tape 5 involved in the increase in a recording capacity, even if the friction coefficient between the magnetic head and the magnetic tape increases, the change in a position of the magnetic tape 5 can be minimized, whereby a tracking precision can be enhanced.

Furthermore, by suppressing the change in a position of the magnetic tape 5 in the width direction, the damage to an edge portion of the magnetic tape 5 can be prevented. More specifically, the magnetic tape 5 is transported with the position of edge portions at both ends in the width direction regulated with the flanges of the guide rollers 6 and 7. In such a configuration, when the magnetic tape 5 is changed in a position in the width direction, the edge portion of the magnetic tape 5 is pressed against the flange of the guide roller 6 or 7 with a strong force, with the result that the magnetic tape 5 may be damaged. The flanges of the guide rollers 6 and 7 are not necessarily required. However, in the case where the flanges are not provided, the traveling magnetic tape is displaced largely from the magnetic head unit, which may damage the magnetic tape and the magnetic head unit. In the present embodiment, by suppressing the change in a position of the magnetic tape 5 in the width direction, the possibility for the edge portion of the magnetic tape to be pressed against the flange of the guide roller 6 or 7 is decreased. Alternatively, in the case where there are no flanges, the possibility for the magnetic tape and the magnetic head unit to be damaged due to the displacement of the magnetic tape traveling is decreased. Thus, the magnetic tape 5 and the head unit 1 can be prevented from being damaged. Particularly in recent years, the stiffness of the magnetic tape 5 is decreased along with the reduction in a thickness, so that the practical effect thereof is great.

Furthermore, in the movable member 2, due to the presence of the stationary member 3 on the tape upstream side and the tape downstream side, the change in a position of the magnetic tape 5 in the width direction can be reduced. More specifically, in general, the third sliding surface 3*a* and the fourth sliding surface 3*b* are placed in most cases on the tape upstream side and the tape downstream side for the purpose of keeping the contact state stably with the winding angle of the magnetic tape 5 with respect to the first sliding surface 2*a* and the second sliding surface 2*b* on which the magnetic elements are placed in the magnetic head being constant. When the magnetic tape 5 is traveled with respect to the magnetic head configured as described above, the third sliding surface 3*a* comes into contact with the magnetic tape 5 in advance of the first sliding surface 2*a* and the second sliding surface 2*b*, so that dust, dirt, etc. adhering to the surface of the tape can be removed. In order to remove dust, dirt, etc. with the third sliding surface 3*a*, it is effective to setting the winding angle of the magnetic tape 5 with respect to the third sliding surface 3*a* to be larger than the winding angle of the magnetic tape 5 with respect to the first sliding surface 2*a* and the second sliding surface 2*b*, thereby increasing the contact pressure with respect to the third sliding surface 3*a*. By increasing the contact pressure with respect to the third sliding surface 3*a*, the friction force between the magnetic tape 5 and the third sliding surface 3*a* becomes larger relative to the friction force between the magnetic tape 5, and the first sliding surface 2*a* and the second sliding surface 2*b*. Thus, by placing the stationary member 3 on the tape upstream side and the tape downstream side of the movable member 2, the effect of suppressing the movement of the magnetic tape 5 in the width direction is large.

Furthermore, in the present embodiment, the size of the movable member 2 in the tape width direction is designed to be sufficiently larger than the width of the magnetic tape 5. More specifically, the movable member 2 is configured so as to come into contact with the magnetic tape 5 over the entire region in the width direction when the magnetic elements 8 and 9 are positioned on the track at the upper end of the magnetic tape 5 and the track at the lower end thereof. Thus, even though the magnetic elements 8 and 9 are positioned on any track, the movable member 2 can be brought into contact with the magnetic tape 5 substantially equally at all times. Consequently, the output between the respective tracks can be made uniform, and the traveling of the magnetic tape 5 can be stabilized. Furthermore, similarly, the traveling of the magnetic tape 5 can be stabilized even during a tracking servo control.

Embodiment 2

Figure 4A:
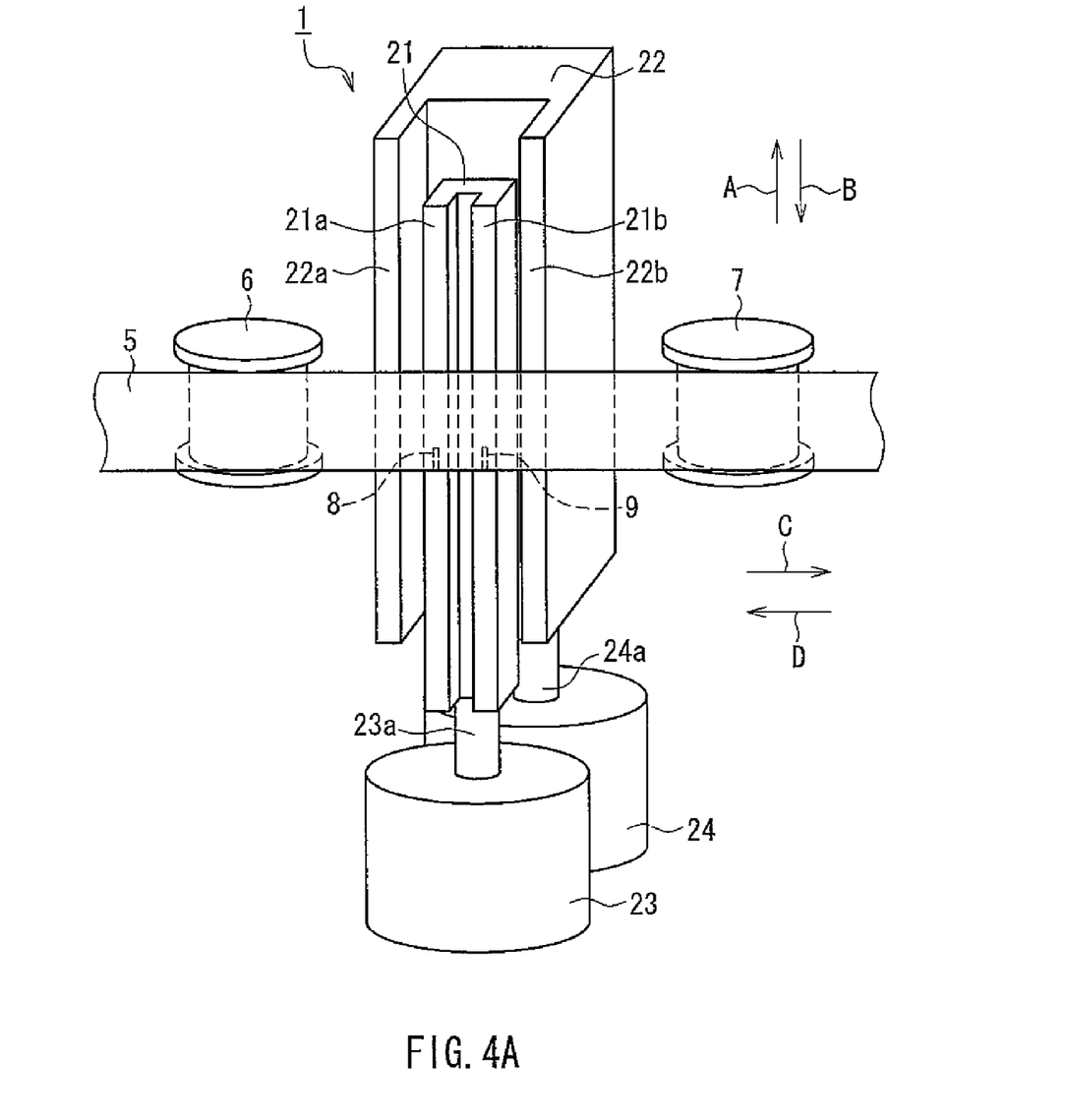
FIG. 4A is a perspective view showing a configuration of the magnetic tape apparatus in Embodiment 2.
Figure 4B:
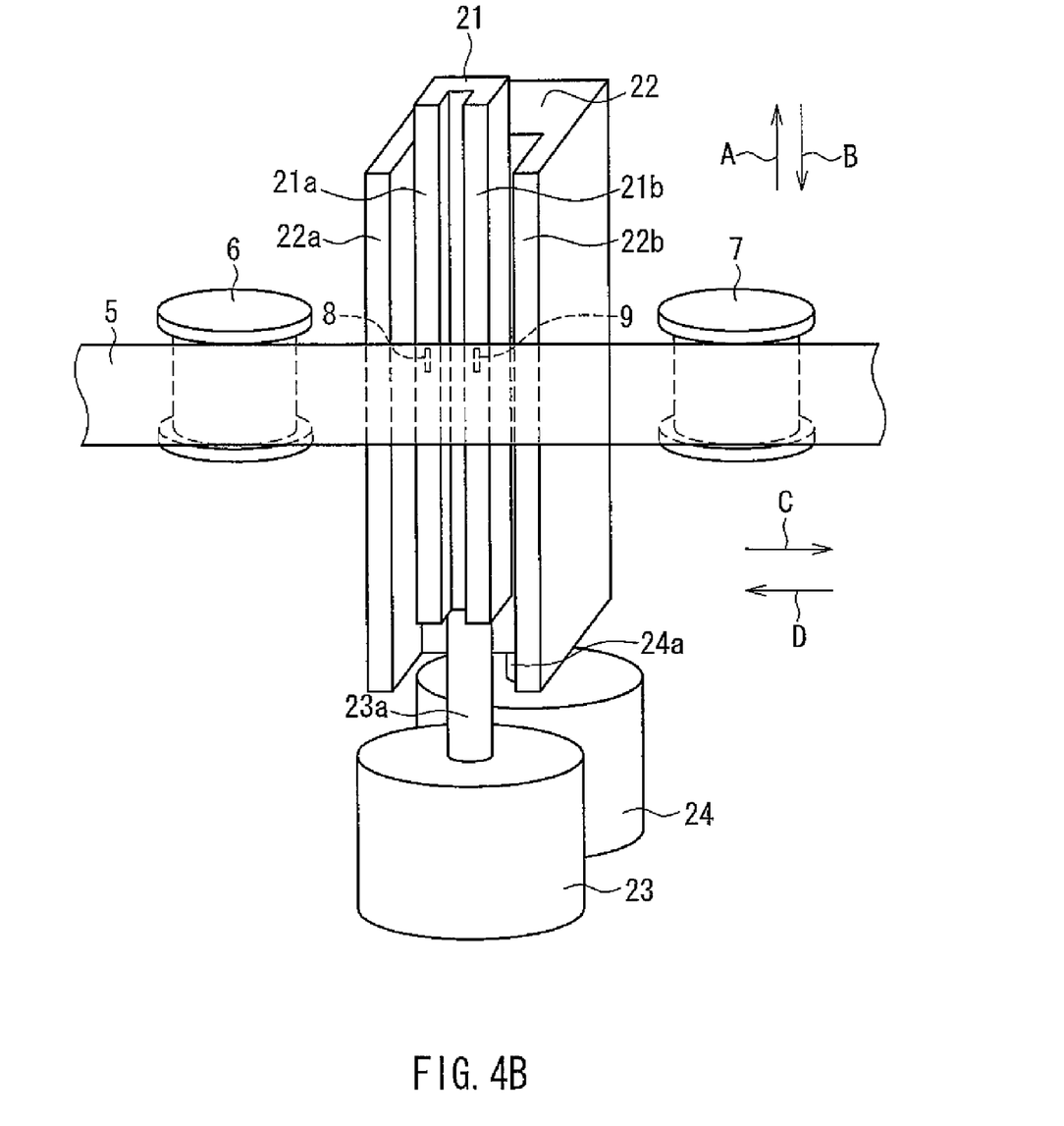
FIG. 4B is a perspective view showing a configuration of the magnetic tape apparatus in Embodiment 2.

FIGS. 4A and 4B are perspective views showing a configuration of a magnetic tape apparatus in Embodiment 2. FIG. 4A shows a state in which magnetic elements 8 and 9 are positioned on a track at a lower end. FIG. 4B shows a state in which the magnetic elements 8 and 9 are positioned on a track at an upper end. In FIGS. 4A and 4B, the same components as those in the configuration shown in FIGS. 1A and 1B are denoted with the same reference numerals as those therein, and the detailed description thereof will be omitted.

A first movable member 21 allows a first output shaft 23a of a first actuator 23 to be screwed in and is placed so as to move in a direction represented by an arrow A or B when the first actuator 23 is operated. Furthermore, the length of the first movable member 21 in the tape width direction is designed so that the first movable member 21 can come into contact with a magnetic tape 5 over the entire region in the width direction while the first movable member 21 is positioned at a lower end in the tape width direction (see FIG. 4A) and is positioned at an upper end in the tape width direction (see FIG. 4B). In the present embodiment, the size of the first movable member 21 in the tape width direction is designed so as to be about twice the width of the magnetic tape 5. Furthermore, a first sliding surface 21a and a second sliding surface 21b of the first movable member 21 are placed side by side in a tape transport direction. The first sliding surface 21a is provided with a magnetic element 8. The second sliding surface 21b is provided with a magnetic element 9. A groove for generating a negative pressure to stabilize the position of the magnetic tape 5 is formed between the first sliding surface 2a and the second sliding surface 2b.

The second movable member 22 allows a second output shaft 24a of a second actuator 24 to be screwed in and is placed so as to move in the direction represented by the arrow A or B when the second actuator 24 is operated. Furthermore, the length of the second movable member 22 in the tape width direction is designed so that the second movable member 22 can come into contact with the magnetic tape 5 over the entire region in the width direction while the second movable member 22 is placed at an upper end in the tape width direction (see FIG. 4A) and is placed at a lower end in the tape width direction (see FIG. 4B). In the present embodiment, the size of the second movable member 22 in the tape width direction is about twice the width of the magnetic tape 5. Furthermore, the second movable member 22 includes a third sliding surface 22a and a fourth sliding surface 22b. The second movable member 22 is placed so that the third sliding surface 22a is positioned on a tape upstream side with respect to the first sliding surface 21a, and a fourth sliding surface 22b is positioned on a tape downstream side with respect to the second sliding surface 21b. Furthermore, the sliding surfaces 21a, 21b, 22a, and 22b are formed with substantially the same height. Furthermore, the sliding surfaces 21a, 21b, 22a, and 22b may be formed all with a flat surface or a curved surface.

The first actuator 23 includes the first output shaft 23a with a gear formed on a surface. The first output shaft 23a is screwed in a screw hole formed on an end surface of the first movable member 21. The second actuator 24 includes the second output shaft 24a with a gear formed on a surface. The second output shaft 24a is screwed in a screw hole formed on an end surface of the second movable member 22. The first actuator 23 and the second actuator 24 are controlled so as to move the first movable member 21 and the second movable member 22 in directions opposite to each other. For example, when the first actuator 23 moves the first movable member 21 in the direction represented by the arrow A, the second actuator 24 moves the second movable member 22 in the direction represented by the arrow B.

When data is recorded on a data band of the magnetic tape 5, it is necessary to move the magnetic elements 8 and 9 to positions where the magnetic elements 8 and 9 can trace a predetermined data band among a plurality of data bands formed on the magnetic tape 5. In the present embodiment, the first movable member 21 is moved in the direction represented by the arrow A or B, whereby the magnetic elements 8 and 9 are moved onto the predetermined data band. Furthermore, when a tracking servo control is performed, the first movable member 21 is moved in the direction represented by the arrow A or B so that an off-track amount between the separated detected track on the magnetic tape 5, and the magnetic elements 8 and 9 becomes zero. Hereinafter, the operation of the magnetic tape apparatus of the present embodiment will be described by exemplifying the magnetic head movement between the data bands.

As shown in FIG. 4A, when the magnetic elements 8 and 9 trace a data band at a lower end, the magnetic tape 5 is transported in a direction represented by an arrow C or D while the positions of the magnetic tape 5 in the twist direction and the width direction are regulated by the guide rollers 6 and 7. When the magnetic tape 5 is transported in the direction represented by the arrow C, data is recorded on the magnetic tape 5 by the magnetic element 8, and when the magnetic tape 5 is transported in the direction represented by the arrow D, data is recorded on the magnetic tape 5 by the magnetic element 9. During this time, servo heads 11 reproduce a servo signal recorded on the servo bands formed in upper and lower portions of the data band.

Next, when the magnetic elements 8 and 9 are moved onto another data band from the state shown in FIG. 4A, the first actuator 23 is driven to rotate the first output shaft 23a, and the second actuator 24 is driven to rotate the second output axis 24a. When the first output axis 23a is rotated, the first movable member 21 is moved in the direction represented by the arrow A. Furthermore, when the second output shaft 24a is rotated, the second movable member 22 is moved in the direction represented by the arrow B. When the magnetic elements 8 and 9 are moved onto a predetermined data band, the operation of the first actuator 23 is stopped to stop the movement of the first movable member 21, and the operation of the second actuator 24 is stopped to stop the movement of the second movement member 22. The movement amount of the first movable member 21 is the same as that of the second movable member 22. FIG. 4B shows a state in which the magnetic elements 8 and 9 are positioned on a data band at an upper end in the tape width direction.

Furthermore, when the first movable member 21 is moved in the direction represented by the arrow B from the state shown in FIG. 4A or 4B, the second movable member 22 is moved in the direction represented by the arrow A. At this time, the movement amount of the first movable member 21 is the same as that of the second movable member 22.

When the magnetic elements 8 and 9 are allowed to follow a track during a tracking servo control, a control signal that sets the separately calculated off-track amount to be zero is input to the first actuator 23 and the second actuator 24, whereby the first movable member 21 and the second movable member 22 are moved in the tape width direction by a predetermined amount. Thus, the magnetic elements 8 and 9 are allowed to follow a track.

The inventors of the present invention measured, with a transmission-type optical sensor, the movement of a tape edge in the width direction (ratio between the vibration amplitude of the magnetic tape and the vibration amplitude of the magnetic head) when the magnetic head having the first movable member 21 and the second movable member 22 with sliding surfaces each having a width in a tape traveling direction of 0.3 mm was vibrated at 100 Hz in the tape width direction, using a LTO3 tape manufactured by Hitachi Maxell Ltd. as the magnetic tape 5. A tape wind-up angle of the second movable member 22 was 10°, the tape wind-up angle of the first movable member 21 was 5°, and the traveling speed of the magnetic tape 5 was set to be 4 m/sec. At this time, the measurement results in each of the conventional configuration, the configuration of Embodiment 1, and the configuration of Embodiment 2 are as shown in Table 1.

TABLE 1

|  | Amplitude of tape/amplitude of head (dB) |
| --- | --- |
| Conventional configuration | −19 |
| Embodiment 1 | −43 |
| Embodiment 2 | −58 |

As is understood from Table 1, the movement of the magnetic tape 5 in the width direction can be suppressed most with the configuration shown in Embodiment 2.

According to the present embodiment, the second movable member 22 is moved in a direction opposite to the movement direction of the first movable member 21 when the first movable member 21 is moved in the tape width direction so as to change the positions of the magnetic elements 8 and 9 on the magnetic tape 5, whereby the change in a position of the magnetic tape 5 in the width direction can be reduced. More specifically, when the first movable member 21 is moved in the direction represented by the arrow A, a movement force in the direction represented by the arrow A is generated with respect to the magnetic tape 5 by the friction force between the magnetic tape 5 and the first movable member 21. However, the movement force in the direction represented by the arrow B can be generated with respect to the magnetic tape 5 by moving the second movable member 22 in the direction represented by the arrow B. Thus, the movement force applied to the magnetic tape 5 in the directions represented by the arrows A and B is balanced, whereby the movement of the magnetic tape 5 in the width direction can be suppressed substantially completely. Thus, even if the friction coefficient between the magnetic head and the magnetic tape 5 is increased by flattening of the magnetic tape 5 involved in the increase in a recording capacity, the change in a position of the magnetic tape 5 can be minimized, and a tracking precision can be enhanced.

Furthermore, in the present embodiment, the size of the first movable member 21 in the tape width direction is set to be sufficiently larger than the width of the magnetic tape 5. More specifically, the first movable member 21 is configured so as to come into contact with the magnetic tape 5 over the entire region in the width direction when the magnetic elements 8 and 9 are positioned on a track at an upper end or on a track at a lower end of the magnetic tape 5. Thus, whichever track the magnetic elements 8 and 9 are positioned on, the first movable member 21 can be brought into contact with the magnetic tape 5 substantially uniformly, which can stabilize the traveling of the magnetic tape 5.

Also, regarding the second movable member 22, the size in the tape width direction is set to be sufficiently larger than the size of the magnetic tape 5 in the width direction, whereby the second movable member 22 can be brought into contact with the magnetic tape 5 substantially uniformly at all times. Thus, the change in a position of the magnetic tape 5 in the twist direction can be suppressed, which can stabilize traveling.

Furthermore, by suppressing the change in a position of the magnetic tape 5 in the width direction, the damage to an edge portion of the magnetic tape 5 can be prevented. More specifically, the magnetic tape 5 is transported by the guide rollers 6 and 7 while the positions of the edge portions at both ends of the magnetic tape 5 in the width direction are regulated. In such a configuration, when the magnetic tape 5 is changed in a position in the width direction, the edge portion of the magnetic tape 5 is pressed against the flange of the guide roller 6 or 7 with a strong force, with the result that the magnetic tape 5 may be damaged. The flanges provided at the guide rollers are not necessarily required. However, in the case where the flanges are not provided, the traveling magnetic tape is displaced largely from the magnetic head unit, which may damage the magnetic tape and the magnetic head unit. In the present embodiment, by suppressing the change in a position of the magnetic tape 5 in the width direction, the possibility for the edge portion of the magnetic tape 5 to be pressed against the flange of the guide roller 6 or 7 is decreased. Alternatively, in the case where there are no flanges, the possibility for the magnetic tape and the magnetic head unit to be damaged due to the displacement of the magnetic tape traveling is decreased. Thus, the magnetic tape 5 and the head unit 1 can be prevented from being damaged. Particularly in recent years, the stiffness of the magnetic tape 5 is decreased along with a reduction in thickness, so that the practical effect thereof is great.

The second movable member 22 can be driven relatively easily by reversing a sign of the control amount of the first movable member 21, followed by multiplying the resultant control amount by an appropriate coefficient.

Furthermore, in the present embodiment, although the first actuator 23 and the second actuator 24 are provided, one actuator for moving either one of the first movable member 21 and the second movable member 22 may be provided. In the case of driving the first movable member and the second movable member with one actuator, a mechanism for transmitting the movement force of the first movable member 21 to the second movable member 22 is provided. For example, racks are formed on the respective opposed surfaces of the first movable member 21 and the second movable member 22, and a gear engaging with both the racks simultaneously is provided, whereby when the first movable member 21 is moved in one direction, the second movable member 22 can be moved in the other direction.

Furthermore, a conventional configuration in which only a magnetic head element chip is moved during a tracking servo control (disclosed, for example, by JP 2005-174450 A) is a conceivable setting to use the present inventive apparatus. According to this conventional configuration, an entire magnetic head is not moved in the tape width direction during the tracking servo control, so that the magnetic head element chip portion comes into contact with only a part (one data band) of the magnetic tape in the width direction, with the result that the position of the magnetic tape is not stable. Thus, the contact position between the magnetic head and the magnetic tape is not stable, and a tracking operation becomes unstable.

Furthermore, as a conventional configuration in which a magnetic head is moved in the tape width direction, for example, there is a conventional configuration disclosed in JP 2004-110977 A and U.S. Pat. No. 5,883,770. The magnetic heads disclosed in these documents respectively have a width smaller than that of the magnetic tape. In such a conventional configuration, when the magnetic head is moved in the tape width direction while the magnetic head is in contact with the magnetic tape, the magnetic head comes into contact with only a part of the magnetic tape in the tape width direction. Therefore, there is a problem that a head touch becomes unstable, and a magnetic tape is deformed, with the result that a tape is likely to be damage. In contrast, according to the present invention, the movable member is configured so as to come into contact with the entire region of the magnetic tape in the width direction, whereby even when the movable member is moved in the width direction while being in contact with the magnetic tape, the head touch can be stabilized, and the deformation of the magnetic tape is suppressed to prevent the occurrence of the damage to the tape.

Furthermore, a conventional configuration provided with a guide movable in a width direction of a magnetic tape (disclosed by, for example, JP 2002-208198 A) is conceivable. According to this conventional configuration, as shown in FIG. 1 of JP 2002-208198 A, the guides 22 and 26 are in contact with a surface (i.e., a surface on which a back coat layer is formed) opposite to a magnetic surface of the tape 12 (i.e., a surface which a reading/writing head 18 is in contact with). In general, the friction coefficient of the surface of the back coat layer of the magnetic tape is lower than that of the surface of the magnetic layer. Thus, according to the configuration disclosed by the above document, in the case where the reading/writing head 18 moves in the tape width direction while being in contact with the tape 12, there is a high possibility that the tape 12 follows the reading/writing head 18 and moves largely in the tape width direction against the regulation by the guides 22 and 26. In contrast, according to the configuration of the present invention, the movable member and the stationary member come into contact with the surface of the magnetic layer of the magnetic tape. Therefore, even if the movable member moves in the tape width direction while the magnetic tape is in contact with the movable member and the stationary member, the movement of the magnetic tape in the tape width direction can be reduced.

The magnetic tape apparatus of the present invention is useful for equipment that uses a magnetic tape as an information medium, and a data storage system for a computer.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A magnetic tape apparatus, comprising: a magnetic head unit having a magnetic element capable of recording or reproducing information with respect to a magnetic tape that has a magnetic layer on one surface; and a tracking servo mechanism positioning the magnetic element in a predetermined track of the magnetic tape,
wherein the magnetic head unit includes:
a movable member that includes the magnetic element, has such a size that the movable member comes into contact with the magnetic tape over an entire region in a width direction thereof, and is placed so as to move in the width direction of the magnetic tape; and
a stationary member placed at a position adjacent to the movable member in a magnetic tape transport direction, and
during a tracking servo control, the movable member and the stationary member come into contact with a surface of the magnetic layer of the magnetic tape simultaneously, and the movable member is moved in the width direction of the magnetic tape by the tracking servo mechanism.

2. A magnetic tape apparatus, comprising: a magnetic head unit having a magnetic element capable of recording or reproducing information with respect to a magnetic tape that has a magnetic layer on one surface; and a tracking servo mechanism positioning the magnetic element in a predetermined track of the magnetic tape,
wherein the magnetic head unit includes:
a first movable member that includes the magnetic element, has such a size that the first movable member comes into contact with the magnetic tape over an entire region in a width direction thereof, and is placed so as to move in the width direction of the magnetic tape; and
a second movable member that is placed at a position adjacent to the first movable member in a magnetic tape transport direction and is placed so as to move in the width direction of the magnetic tape, and
during a tracking servo control, the first movable member and the second movable member come into contact with a surface of the magnetic layer of the magnetic tape simultaneously, and the second movable member is moved in a direction opposite to a moving direction of the first movable member, when the first movable member is moved by the tracking servo mechanism.

3. The magnetic tape apparatus according to claim 1, wherein the movable member and the stationary member respectively have two sliding surfaces,
one of the sliding surfaces of the stationary member is placed on an upstream side in the magnetic tape transport direction with respect to one of the sliding surfaces of the movable member, and
the other sliding surface of the stationary member is placed on a downstream side in the magnetic tape transport direction with respect to the other sliding surface of the movable member.

4. The magnetic tape apparatus according to claim 2, wherein a movement amount of the first movable member and a movement amount of the second movable member are the same during the tracking servo control.

5. The magnetic tape apparatus according to claim 2, wherein the first movable member is capable of coming into contact with the magnetic tape over an entire region in a width direction thereof, and the second movable member is capable of coming into contact with the magnetic tape over an entire region in a width direction thereof.

6. The magnetic tape apparatus according to claim 2, wherein the first movable member has a width larger than that of the magnetic tape, and the second movable member has a width larger than that of the magnetic tape.

* * * * *